(No Model.) 2 Sheets—Sheet 1.
J. A. STONE.
CORN HARVESTING MACHINE.
No. 521,681. Patented June 19, 1894.
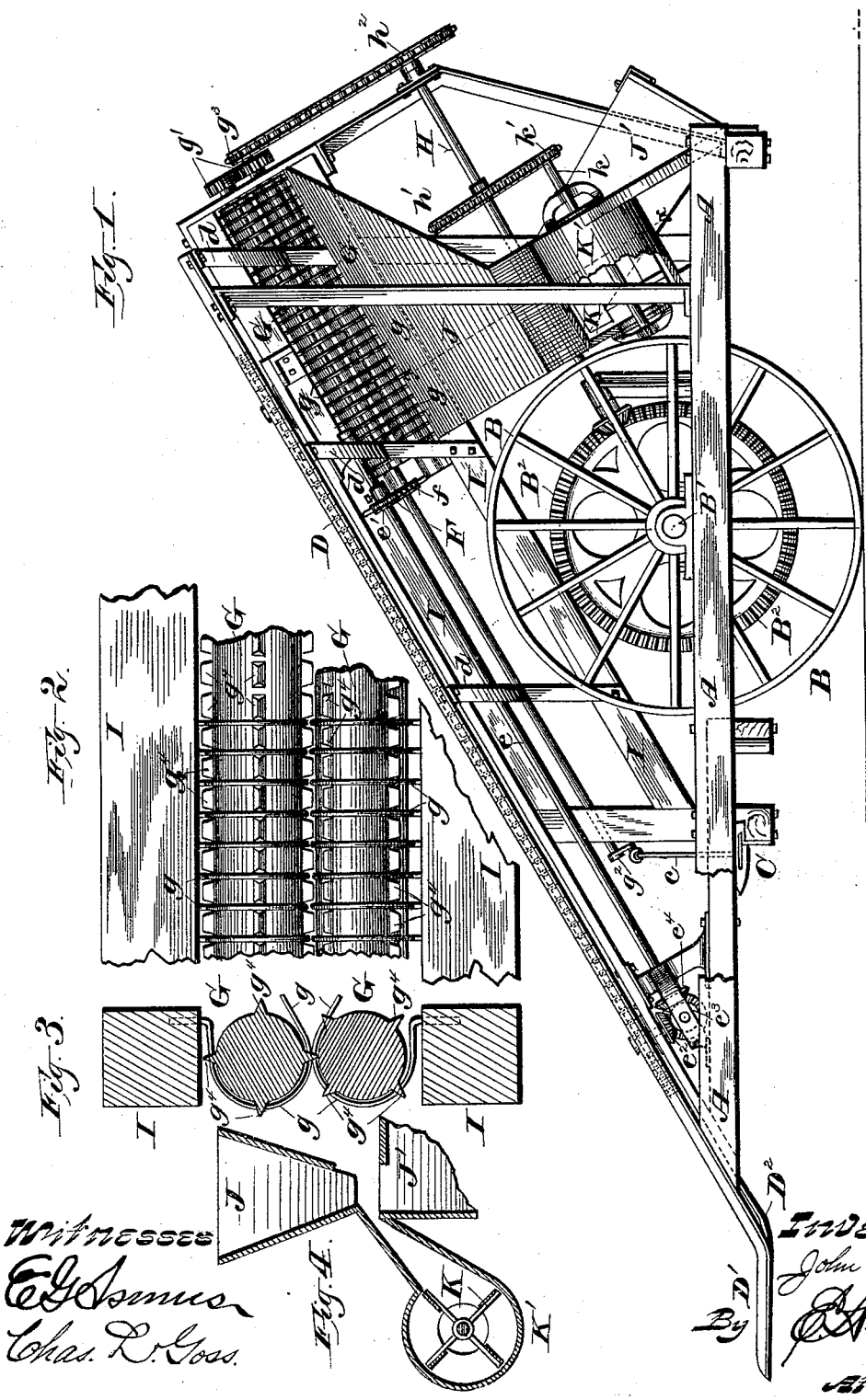
Witnesses
E. G. Asmus
Chas. R. Goss
Inventor:
John A. Stone,
By 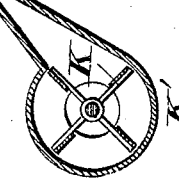
Attorney.

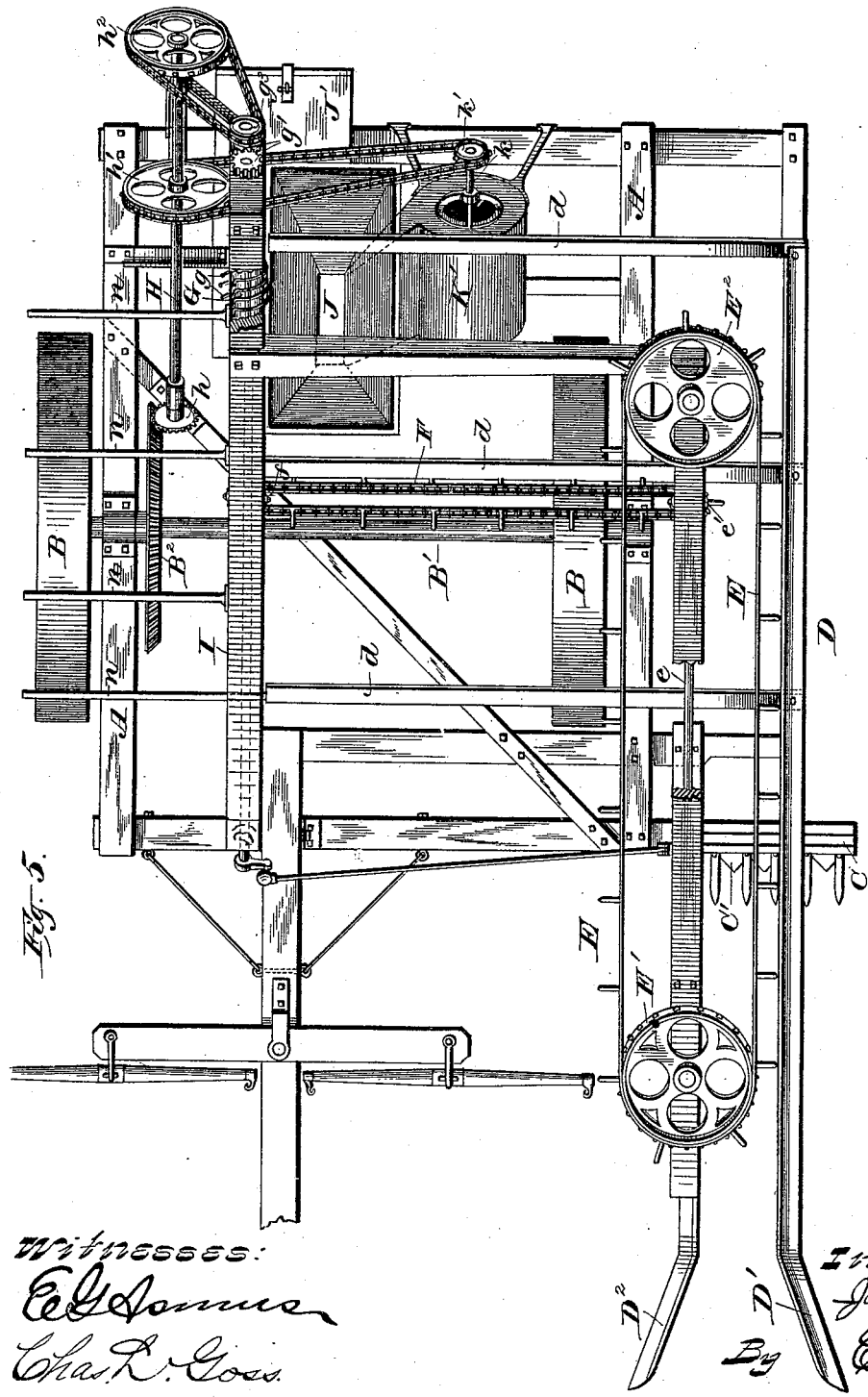

UNITED STATES PATENT OFFICE.

JOHN A. STONE, OF VAIL, IOWA.

CORN-HARVESTING MACHINE.

SPECIFICATION forming part of Letters Patent No. 521,681, dated June 19, 1894.

Application filed June 21, 1887. Serial No. 241,955. (No model.)

*To all whom it may concern:*

Be it known that I, JOHN A. STONE, of Vail, in the county of Crawford and State of Iowa, have invented certain new and useful Improvements in Corn-Harvesting Machines; and I do hereby declare that the following is a full, clear, and exact description of the invention, which will enable others skilled in the art to which it appertains to make and use the same, reference being had to the accompanying drawings and to the letters of reference marked thereon, which form a part of this specification.

My invention relates to that class of corn harvesting machines in which the ears are separated from the stalks by passing the latter between a pair of rollers, and its main objects are to prevent the ears from passing sidewise between the rollers and thereby clogging and obstructing said rollers, impeding the machine and mutilating the corn; to turn and present the ears to said rollers in the proper position to be operated upon thereby; to remove loose husks, silks, dirt and the like from the ears, and to pass the ear-bearing portions only of the stalks between the rollers and thereby diminish the draft of the machine.

It consists essentially of a pair of rollers provided with peripheral projections and fixed guards extending between said rollers transversely thereto, and of other features hereinafter described in detail.

In the accompanying drawings, like letters designate the same parts in the several figures.

Figure 1 is a side elevation of my improved machine. Fig. 2 is a detail view showing in side elevation on an enlarged scale the ear severing or snapping rollers. Fig. 3 is a cross section of the same. Fig. 4 is a like section of the ear-receiving hopper and fan on the line $x$ $x$, Fig. 1; and Fig. 5 is a plan view of the machine.

A A represent the main frame of the machine, provided with bearings for, and supported by, the rotary axle B' upon which are mounted the supporting wheels B B. C is the finger bar located at the front and on one side of said frame and C' is a reciprocating scythe or cutter working in said finger bar. Over and at right angles to said finger bar and cutter is supported the rearwardly ascending guide rail D which is extended in front of said cutter and bent outwardly to form the gathering arm D'.

$D^2$ is the other gathering arm bent in the opposite direction and attached to frame A.

G G are a pair of cylindrical rollers provided with broken longitudinal ribs $g^4$ $g^4$ or any suitable peripheral projections and supported, one above the other, in a frame I vertically inclined to correspond with the inclination of guide D, at or near the opposite side of the machine from the upper end of said guide and parallel therewith. Although the rollers G are preferably inclined as shown, they may be set horizontally or in any other position in which the corn may be conveniently conducted thereto and operated upon thereby.

$g$ $g$ are curved guards secured in the roller frame I and passing around close to the faces of the rollers G at short intervals through the notches in the ribs $g^4$ $g^4$ between said rollers, as shown in Figs. 2 and 3.

To the upper and rear ends of the roller shafts are fixed the interworking twin gears $g'$ $g'$ by which they are caused to turn simultaneously in opposite directions or toward each other. The upper roller shaft is extended at the front end and provided with a crank $g^2$ which is connected by a pitman $c$ with, and drives, the cutter C'.

H is a counter shaft supported in bearings below and parallel with the rollers G and provided at its front end with a pinion $h$ working with the main driving gear $B^3$ on the supporting axle B', at an intermediate point with a sprocket wheel $h'$ and at the rear end with a sprocket wheel $h^2$, which is connected by a chain belt with a sprocket wheel $g^3$ on the lower roller shaft.

$d$ $d$ are guide rests or supports attached at one end to the inclined guide D from which they extend downwardly a short distance and then turn extending transversely across the machine toward the rollers G and roller frame, one or more of said guide rests terminating adjacent to the opening between said rollers.

$n$ $n$ are arms projecting laterally from the opposite side of the roller frame I and rollers G over the adjacent side of the machine and arranged to receive the stalks after they pass between said rollers and deliver them clear of the machine at one side thereof.

E is a chain belt provided at intervals with projections, and supported and driven by sprocket wheels E′ E² with its ascending section parallel with and a little inside of the guide D.

To the lower end of the shaft of the sprocket wheel E′ is fixed the bevel gear $e^2$ working with the idle gear $e^3$, which is supported in a bracket bearing provided therefor and in turn works with a similar bevel gear $e^4$ upon a shaft $e$ extending therefrom at right angles to the axis of said sprocket wheel and parallel with the chain belt E toward the upper sprocket wheel E².

F is a chain belt having projections like those on belt E and supported and working transversely thereto and near and parallel with one of the intermediate guide rests $d$, upon a sprocket wheel $e'$ on the upper end of shaft $e$ and upon a sprocket wheel $f$ on the upper roller shaft by which it is driven together with the sprocket wheel E′ and chain belt E.

Underneath the receiving side of the rollers G is secured the hopper J in position to catch the ears as they are severed from the stalks by said rollers. Said hopper converges toward the lower side and communicates with a box or receptacle J′ from which the corn may be removed at intervals through the door at its lower end or continuously discharged into any suitable, detachable receptacle.

K is a fan inclosed in a suitable case K′, the blast or eduction pipe of which communicates with a transverse opening through the base of hopper J, as shown in Fig. 4. Said fan is driven by means of a chain belt connecting the sprocket wheel $h'$ on the shaft H with a sprocket wheel $k'$ on the extended end of the fan shaft $k$.

The operation of my improved machine is as follows: The machine being so driven or guided as to cause the gathering arms D′ D² to receive a row of corn between them, the stalks are conducted by said gathering arms to the lower end of the chain E, the projections of which engage the stalks, carry them along the guide D to the scythe C′ by which they are severed from the ground, and deposit them upon the transverse guide rests $d$ $d$. As the stalks are deposited upon the guide rests $d$ $d$ they are engaged below the ears by the projections on chain F and moved thereby laterally upon said guide rests to the rollers G G, between which said stalks are drawn while the ears are prevented from passing between them by the guards $g$ $g$, which turn said ears obliquely or transversely to said rollers in position to be engaged by the ribs or projections $g^4$ $g^4$ by which the stems are broken and the ears severed from the stalks. The stalks pass between said rollers and through the roller frame I upon the arms $n$ $n$, and are conducted thereby to, and discharged at, the side of the machine. The ears dropping from the rollers G G are caught by hopper J and conducted thereby into the receiver J′ and as they pass the transverse opening at the base of said hopper through the air blast produced by fan K the loose husks, silks, dirt, &c., clinging to them are separated and blown through the opening in the side of said hopper.

I claim—

1. The combination in a corn harvesting machine of a pair of rollers provided with ribs or projections on their faces, mechanism for rotating the same toward each other and guards extending transversely between said rollers, substantially as and for the purposes set forth.

2. The combination in a corn harvesting machine of a stalk cutter, a pair of rollers set one above the other and provided with ribs or projections on their faces, mechanism for rotating said rollers, guards extending transversely between said rollers and a conveyer arranged to move the stalks as they are cut laterally to said rollers, substantially as and for the purposes set forth.

3. The combination in a corn harvesting machine of a pair of rollers provided with longitudinal ribs notched at intervals, curved guards extending between said rollers and lying close to their faces in the notches in said ribs, substantially as and for the purposes set forth.

4. The combination in a corn harvesting machine of a stalk cutter, an endless belt provided with projections driven approximately in the line of travel of the machine, a conveyer driven transversely to the line of travel of the machine and a pair of ear severing rollers placed transverse to the movement of said conveyer, said endless belt being arranged to conduct the stalks to said cutter and deliver the same upon said conveyer, which is arranged to move them laterally to said ear severing rollers so as to cause only the ear bearing portions of the stalks to pass between and the butts to clear said rollers, substantially as and for the purposes set forth.

5. The combination in a corn harvesting machine of a stalk cutter, gathering arms, a guide and a conveyer working therewith and arranged to conduct the stalks in an upright position to said cutter and deposit the same upon transverse supports or guides, a conveyer arranged to move the stalks laterally upon said transverse guides or supports, a pair of rollers set one above the other and arranged to receive the stalks from said transverse conveyer and guards placed over the receiving sides of said rollers and arranged to prevent the ears from being drawn between them substantially as and for the purposes set forth.

In testimony that I claim the foregoing as my own I affix my signature in presence of two witnesses.

JOHN A. STONE.

Witnesses:
 CHAS. L. GOSS,
 GEORGE M. GOLL.